(12) United States Patent
Umayabashi

(10) Patent No.: US 7,239,637 B2
(45) Date of Patent: Jul. 3, 2007

(54) PACKET COMMUNICATION SYSTEM, NETWORK SIDE DEVICE AND TERMINAL SIDE DEVICE THEREOF AND IDENTIFIER ASSIGNING METHOD

(75) Inventor: Masaki Umayabashi, Tokyo (JP)

(73) Assignee: NEC Corporation, Tokyo (JP)

( * ) Notice: Subject to any disclaimer, the term of this patent is extended or adjusted under 35 U.S.C. 154(b) by 930 days.

(21) Appl. No.: 10/093,428

(22) Filed: Mar. 11, 2002

(65) Prior Publication Data

US 2002/0141417 A1  Oct. 3, 2002

(30) Foreign Application Priority Data

Mar. 13, 2001  (JP)  ............................. 2001-070022

(51) Int. Cl.
*H04L 12/56* (2006.01)
(52) U.S. Cl. .................................... 370/395.3; 370/458
(58) Field of Classification Search ..................... None
See application file for complete search history.

(56) References Cited

U.S. PATENT DOCUMENTS

| | | | | |
|---|---|---|---|---|
| 5,708,655 | A * | 1/1998 | Toth et al. ................... | 370/313 |
| 5,850,400 | A | 12/1998 | Eames et al. | |
| 5,905,728 | A * | 5/1999 | Han et al. ................. | 370/395.3 |
| 6,073,016 | A * | 6/2000 | Hulthen et al. .......... | 455/435.2 |
| 6,741,576 | B1 * | 5/2004 | Alimi et al. ............. | 370/395.3 |
| 6,747,990 | B1 * | 6/2004 | Umayabashi et al. ....... | 370/468 |
| 6,778,833 | B1 * | 8/2004 | Fortuna ...................... | 370/335 |
| 6,792,474 | B1 * | 9/2004 | Hopprich et al. ........... | 370/392 |
| 6,891,856 | B2 * | 5/2005 | Umayabashi ................ | 370/468 |
| 2002/0024971 | A1 * | 2/2002 | Umayabashi ............... | 370/468 |
| 2002/0071437 | A1 * | 6/2002 | Nishikado et al. ..... | 370/395.63 |

FOREIGN PATENT DOCUMENTS

| | | |
|---|---|---|
| EP | 0 913 969 A1 | 10/1997 |
| JP | 10-75244 | 3/1998 |
| JP | 2001-36550 | 2/2001 |

OTHER PUBLICATIONS

Japanese Office Action dated Apr. 15, 2005, with partial English translation.
European Search Report dated Sep. 1, 2006.

* cited by examiner

*Primary Examiner*—Chi Pham
*Assistant Examiner*—Anh-Vu Ly
(74) *Attorney, Agent, or Firm*—McGinn IP Law Group, PLLC

(57) ABSTRACT

A packet communication system is constructed with a plurality of terminal side devices and a network side device including a dynamic identifier assigning portion 141 and a time slot allocation portion 1242. The dynamic identifier assigning portion 141 transmits an identifier information assigned to the respective terminal side devices in an initial setting state to the respective terminal side devices by means of a control signal. When an identifier assignment release request is received from an identifier control portion 100 of the terminal side device in a usual state, the dynamic identifier assigning portion changes the state of an identifier assigned to the terminal side device to the non-assigned state. When an identifier assigning request is received, the dynamic identifier assigning portion searches identifiers in the non-assigned state and, when there is an identifier in the non-assigned state, changes the state of the identifier to the assigned state and notifies the terminal side device from which the identifier assigning request is transmitted of the identifier assigned to the terminal side device.

19 Claims, 13 Drawing Sheets

| ID | #A | #B | ... | #X |
|---|---|---|---|---|
| STATE | TERMINAL SIDE DEVICE 1200 | Free | ... | TERMINAL SIDE DEVICE 1230 |

Fig. 3

| 300 | ID | #A | #B | #C |
|---|---|---|---|---|
| 301 | STATE | TERMINAL SIDE DEVICE 1200 | TERMINAL SIDE DEVICE 1210 | TERMINAL SIDE DEVICE 1220 |
| | | 301-1 | 301-2 | 301-3-(1) |

Fig. 9A

| 300 | ID | #A | #B | #C |
|---|---|---|---|---|
| 301 | STATE | TERMINAL SIDE DEVICE 1200 | TERMINAL SIDE DEVICE 1210 | Free |
| | | 301-1 | 301-2 | 301-3-(2) |

Fig. 9B

| 300 | ID | #A | #B | #C |
|---|---|---|---|---|
| 301 | STATE | TERMINAL SIDE DEVICE 1200 | TERMINAL SIDE DEVICE 1210 | TERMINAL SIDE DEVICE 1230 |
| | | 301-1 | 301-2 | 301-3-(3) |

Fig. 9C

PACKET COMMUNICATION SYSTEM, NETWORK SIDE DEVICE AND TERMINAL SIDE DEVICE THEREOF AND IDENTIFIER ASSIGNING METHOD

BACKGROUND OF THE INVENTION

1. Field of the Invention

The present invention relates to a packet communication system and, in particular, the present invention relates, in a shared medium type point-to-multi point communication system in which a plurality of terminal side devices are connected to one network side device through a physical medium, to an assigning technology for dynamically assigning an identifier for identifying an up link time slot allocated by the network side device to an assigning object housed in each terminal side device.

2. Description of the Related Art

As a system with which an access network may be realized at low cost, there is a shared medium type point-to-multi point communication system in which a network side device is connected to a plurality of terminal side devices through a shared physical medium. FIG. 12 shows ATM-PON (Asynchronous Transfer Mode-Passive Optical Network) system, which is an example of the shared medium type point-to-multi point communication system and which includes, for example, four terminal side devices. As shown in FIG. 12, the ATM-PON system includes a plurality of terminal side devices 1200 to 1230, which are connected to a network side device 1240 through an optical splitter/coupler 1260. In such ATM-PON system, in order to avoid collision of data (referred to as "cell", hereinafter) on a transmission line (referred to "shared transmission path", hereinafter) between the optical splitter/coupler 1260 and the network side device 1240, which is commonly used by all of the terminal side devices 1200 to 1230, the respective terminal side devices 1200 to 1230 transmit cells to the network side device 1240 according to a time slot information allocated thereto by the network side device 1240.

A cell transfer operation from each of the terminal side devices 1200 to 1230 to the network side device 1240 in the ATM-PON system will be described with reference to FIG. 12.

The network side device 1240 includes a time slot allocator 1242 for allocating time slots to the respective terminal side devices 1200 to 1230 and an identifier assignor 1241 for assigning identifiers for identifying the allocated time slot of every terminal side device (referred to as merely "identifiers", hereinafter) to the terminal side devices 1200 to 1230. Further, it is assumed that the terminal side device 1200 is constructed with a buffer 1201 for accumulating input cells from respective terminals 1280 and 1281 and an output control portion 1202 for controlling outputs of the cells in the buffer 1201 according to the time slot information notified by the network side device 1240. Incidentally, it is assumed that the respective terminal side devices 1210, 1220 and 1230 have identical constructions to that of the terminal side device 1200. The network side device 1240 is connected to the terminal side devices 1200 to 1230 through the shared transmission path 1270 between the network side device 1240 and the optical splitter/coupler 1260 and individual transmission paths 1250 to 1253 between the optical splitter/coupler 1260 and the terminal side devices 1200 to 1230.

In an initial setting, the identifier assignor 1241 of the network side device 1240 assigns the identifiers to the respective terminal side devices 1200 to 1230 and transmits the assigned identifiers to the output control portions 1202 of the respective terminal side devices 1200 to 1230 through a control signal 1291. Each of the output control portions 1202 holds the identifier assigned thereto and uses it when it outputs a cell in a usual state.

Now, the usual state will be described.

The time slot allocator 1242 of the network side device 1240 allocates the time slots to the respective terminal side devices 1200 to 1230. And then, the time slot allocator 1242 obtains an identifier information of the respective terminal side devices 1200 to 1230 from the identifier assignor 1241 and describes the identifiers of the terminal side devices 1200 to 1230 corresponding to the allocated time slots. The time slot allocator 1242 notifies the output control portions of the respective terminal side devices 1200 to 1230 of the time slot information including described identifiers by means of a control signal 1290. Each output control portion 1202 receives the time slot information from the network side device 1240 and, when the described identifier is coincident with the identifier assigned thereto, outputs the cell in the buffer 1201. In the buffer 1201, input cells from the terminals 1280 and 1281 are accumulated and the input cells are outputted to the network side device 1240 by the output control portion 1202. The cells outputted from the terminal side devices 1200 to 1230 are transferred to the network side device 1240 through the individual transmission paths 1250 to 1253, the optical splitter/coupler 1260 and the shared transmission path 1270 and, further, transferred to a station device through a transmission path 1292.

As described above, in the ATM-PON system, the terminal side devices 1200 to 1230 having identifiers assigned by the identifier assignor 1241 of the network side device 1240 can transmit data cells to the network side device 1240.

However, there are problems in such system.

A first problem is that, since the number of terminal side devices, which can transmit data cells to the network side device, is limited to a total number of identifiers, it is impossible to efficiently accommodate the terminal side devices when the number of the terminal side devices exceeds the total number of the identifiers. This will be described in more detail.

In FIG. 12, it is assumed that three identifiers #A, #B and #C are set for the four terminal side devices 1200 to 1230. FIG. 13 shows an example of the assigning states 1300, 1310, 1320 and 1330 of the identifiers to the respective terminal side devices 1200, 1210, 1220 and 1230 and the working states 1301, 1311, 1321 and 1331 thereof in time series under the above condition. Each of the assigning states 1300 to 1330 includes an assigned state and a not assigned state and, in the assigned state, an identifier assigned is shown. In each of the working states 1301 to 1341, there are an ON state in which a communication to the network side device 1240 is being performed and an OFF state in which a communication to the network side device 1240 is not performed due to non-use period or cutoff of a power source.

In the initial setting, the identifiers #A, #B and #C are assigned to the terminal side devices 1200, 1210 and 1220, respectively, and no identifier is assigned to the terminal side device 1230. Now, it is assumed that the working state 1321 of the terminal side device 1220 is turned from the ON state to the OFF state at a time instance T and, thereafter, the working state 1331 of the terminal side device 1230 is turned from the OFF state to the ON state at a time instance T'. Even in such case, the identifiers #A, #B and #C are fixedly assigned to the terminal side devices 1200, 1210 and 1220, respectively. Therefore, no identifier is assigned to the terminal side device 1230 whose working state becomes the ON state after the time instance T', so that the terminal side devices 1230 can not transmit data cell to the network side device 1240.

Since the identifiers are fixedly assigned to the respective terminal side devices in the conventional system as mentioned above, the terminal side devices to which no identifiers are assigned in the initial setting step can not transmit data cells to the network side device and the number of the terminal side devices, which can transmit data cells to the network side device is limited to the total number of the identifiers. Consequently, the conventional system can not efficiently accommodate the terminal side devices when the number of the terminal side devices exceeds the total number of the identifiers.

A second problem of the conventional system in which the identifiers are fixedly assigned to the terminal side devices will be described. When an identifier is assigned to a group of connections accommodated in each of the terminal side devices, there may be a case where objects to be assigned can not be efficiently accommodated even if the total number of identifiers is larger than the number of the objects to which identifiers are assigned.

For example, it is assumed in FIG. 12 that the total number of identifiers is 4 and the number of the objects to which identifiers are assigned and which are accommodated in the whole system is 3. In the conventional system, one identifier is fixedly assigned to each of the terminal side devices 1200 to 1230. When three objects to which identifiers are assigned are accommodated in one terminal side device (for example, the terminal side device 1200), no identifier is assigned to two of the three objects, so that these objects can not transmit data cells to the network side device.

As such, when the number of objects accommodated in each of the terminal side device is not uniform in the conventional system in which the identifiers are fixedly assigned to the respective terminal side devices, there may be objects to which no identifier is assigned and which can not transmit data cells to the network side device. Therefore, it is impossible to efficiently accommodate the objects even if the total number of identifiers is larger than the number of the objects.

SUMMARY OF THE INVENTION

According to the first aspect of the invention, a packet communication system in which a plurality of terminal side devices and a network side device are connected to each other through a shared transmission medium, the network side device allocates time slots to identifier assigning objects accommodated in each of the respective terminal side devices and the respective identifier assigning objects accommodated in the respective terminal side device transfer packets through a physical medium by using the time slots allocated thereto, is provided. The packet communication system is featured by that the network side device comprises identifier assigning means for assigning identifiers for identifying time slots allocated to the respective identifier assigning objects accommodated in the terminal side device and notifying the assigned identifiers to the respective identifier assigning objects and time slot allocation means for allocating time slots to the respective identifier assigning objects accommodated in the terminal side device, describing the identifiers assigned to the identifier assigning objects in the time slots and notifying the identifiers to the objects and the terminal side device comprises buffer means for storing packets inputted from a plurality of terminals connected to the terminal side device in every identifier assigning object, output control means for holding identifiers assigned to the respective identifier assigning object accommodated in the terminal side device according to a notice content notified by the identifier assigning means of the network side device and, when the identifiers described in the time slots notified by the time slot allocation means are coincident with the identifiers assigned to the identifier assigning objects accommodated in the terminal side device, for outputting packets from the buffer means for the identifier assigning objects and identifier control means for transmitting a request for requesting an assignment of identifier to identifier assigning objects to which identifiers are not assigned to the network side device, wherein the identifier assigning means includes dynamic assigning means for changing a state of an identifier in the assigned state to the non-assigned state by performing an identifier release processing for the identifier on demand, selecting, when an identifier assigning request is received from the identifier control means and there is one or more identifiers in the non-assigned state, one of the identifiers and assigning the selected identifier to the identifier assigning object from which the identifier assignment request is transmitted and notice means for notifying the object in question of the identifier release processing, an assignment of a new identifier or no identifier in the non-assigned state for the identifier assigning request.

It is preferable that, when the dynamic assigning means receives the release request of identifier from the identifier control means or there is no identifier in the non-assigned state although the dynamic assigning means receives the identifier assigning request from the identifier control means, the dynamic assigning means performs the identifier release processing.

Alternatively, the dynamic assigning means may perform the releasing processing of the identifier periodically or when there is no identifier in the non assigned state although it receives the identifier assigning request from the identifier control means.

Alternatively, the dynamic assigning means may perform the identifier release processing when the identifier assigning request from the identifier control means is received.

The dynamic assigning means may select an object having an identifier assigned for a time exceeding a preset threshold time as an object whose identification is to be released, select an object whose non-communication time exceed a preset threshold time as an object whose identifier is to be released, select an object according to a predetermined priority or select randomly. Further, the above situations of the object to be selected may be combined.

As the object to be assigned, a group of one or a plurality of connections, a group of connections accommodated in one terminal side device, a group of connections accommodated in one terminal side device and classified in every service class or a group of connections accommodated in one terminal side device in every user may be considered.

The packet to be transferred may be cell used in asynchronous transfer mode.

According to a second aspect of the present invention, a network side device of a packet communication system in which the network side device is connected to a plurality of terminal side devices by using a shared communication medium is provided, which is featured by comprising identifier assigning means for assigning identifiers for identifying time slots allocated to respective identifier assigning objects accommodated in a terminal side device and notifying the assigned identifiers to the respective identifier assigning objects and time slot allocation means for allocating time slots to the respective identifier assigning objects accommodated in the terminal side device, describing the identifiers assigned to the identifier assigning objects in the time slots and notifying the objects of the identifiers, wherein the identifier assigning means includes dynamic assigning means for changing a state of an identifier in the assigned state to the non-assigned state by performing an identifier release processing on demand, selecting, when an identifier assigning request is received from the identifier control means and there is one or more identifiers in the non-assigned state, one of the identifiers and assigning the selected identifier to the identifier assigning object from which the identifier assignment request is transmitted and notice means for notifying the object in question of the identifier release processing, an assignment of a new identifier or no identifier in the non-assigned state for the identifier assigning request.

According to another aspect of the present invention, a terminal side device which is connected to a network side device through a transmission medium used commonly by other terminal side devices and transfers packets from objects accommodated therein by using time slots allocated to the objects by the network side device, is provided. The terminal side device is featured by comprising buffer means for storing packets inputted from a plurality of terminals connected to the terminal side device in every identifier assigning object, output control means for holding identifiers assigned to the respective identifier assigning object accommodated in the terminal side device and notified by the identifier assigning means of the network side device and, when the identifiers described in the time slots notified by the time slot allocation means are coincident with the identifiers assigned to the identifier assigning objects accommodated in the terminal side device, outputting packets from the buffer means for the identifier assigning objects and identifier control means for transmitting a request for requesting an assignment of identifier to identifier assigning objects in the non-assigned state to the network side device.

The identifier control means may include means for transmitting a release request of identifier assigned to an object to the network side device.

According to another aspect of the present invention, an identifier assigning method for use in a communication system in which a plurality of terminal side devices and a network side device are connected to each other through a shared transmission medium, for assigning identifiers for identifying time slots allocated to objects accommodated in a terminal side device, is provided. The identifier assigning method is featured by comprising the step of transmitting an identifier assigning request for an assignment of identifier to an object having no identifier assigned to the network side device in the terminal side device, the steps of confirming states of all identifiers when the network side device receives the identifier assigning request from the terminal side device, selecting one of identifiers, which are not assigned as yet, if one or more identifiers, which are not assigned as yet, exist, notifying the object from which the identifier assigning request is transmitted of the selected identifier as an identifier to be assigned to the object, performing an assignment release processing for an identifier in an assigned state if there is no identifier in the non-assigned state, selecting one of identifiers if there are identifiers, which become in the non-assigned state by the assignment release processing, notifying the object of the selected identifier as an identifier to be assigned to the object, and notifying the object of absence of identifier to be assigned thereto when there is no identifier which becomes in the non-assigned state by the assignment release processing, in the network side device.

It may be possible that the network side device transmits the identifier assigning request for an object in the non-assigned state to the network side device, the network side device, when receives the assigning request, changes the state of the object from the assigned state to the non-assigned state and notifies the object of the change of the state of the object.

The network side device may perform the assignment release processing for the assigned identifier periodically.

According to another aspect of the present invention, an identifier assigning method for assigning an identifier used to identify a time slot allocated to a terminal side device of a plurality of terminal side devices in a system including a network side device connected to the plurality of the terminal side devices through a shared transmission medium is provided, in which the terminal side device transmits an identifier assigning request for an object, to which an identifier is not assigned though it is to be assigned, to the network side device, the network side device responds to the identifier assigning request from the terminal side device performs an assignment release processing for already assigned identifiers and, there are identifiers, which become non-assigned identifiers as a result of the assignment release processing, select one of the non-assigned identifiers, sets the selected non-assigned identifier as an identifier to be assigned to the object in the terminal side device from which the identifier assigning request is transmitted, notifies the object of the identifier and, when there is no identifier, which becomes non-assigned identifier as the result of the assignment release processing, notifies the object of absence of identifier to be assigned thereto.

In the packet communication system of the present invention, an identifier assigned to a terminal side device in an OFF state is made a non-assigned identifier. The identifier in the OFF state, which is thus made non-assigned identifier, may be assigned to a terminal side device, which is in an ON state and to which no identifier is not assigned, so that a larger number of terminal side devices than the number of identifiers can be connected to the network side device.

BRIEF DESCRIPTION OF THE DRAWINGS

Embodiments of the present invention will be described in detail with reference to the drawings, in which:

FIG. 3 is a construction of an identifier managing table for realizing the identifier assigning method according to the first embodiment of the present invention;

FIGS. 9(A)–9(C) are other message flowcharts between the network side device and the terminal side devices, for realizing the identifier assigning method according to the third embodiment of the present invention;

DETAILED DESCRIPTION OF THE PREFERRED EMBODIMENTS

A first embodiment will be described first with reference to the drawings.

Figure 1:
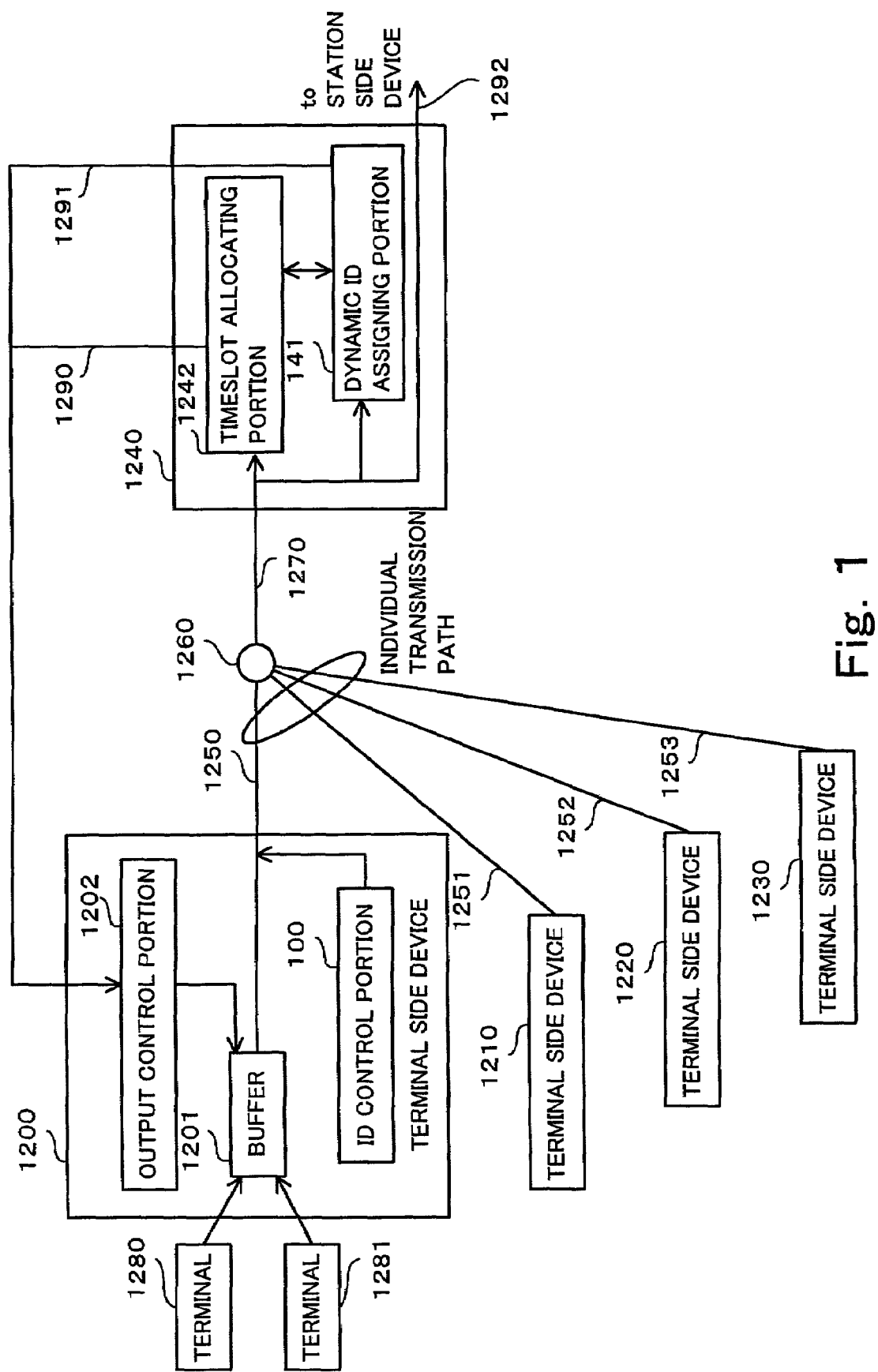
FIG. 1 shows a construction of a point-to-multi point communication system using a shared transmission medium, for realizing an identifier assigning method according to a first embodiment of the present invention.
Figure 12:
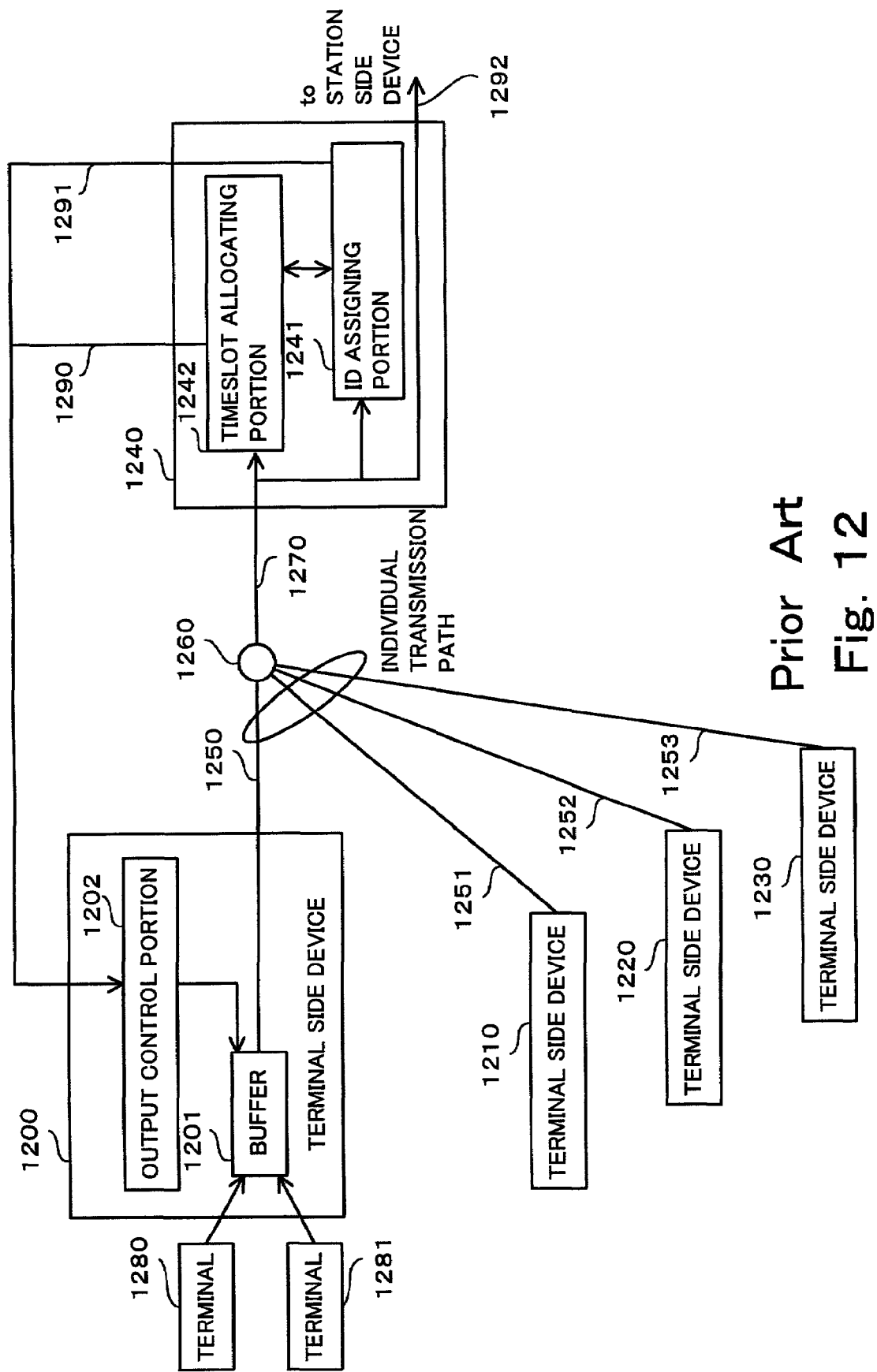
FIG. 12 shows a construction of a conventional point-to-multi point communication system using a shared transmission medium, for realizing a time slot allocation control method.
Figure 13:
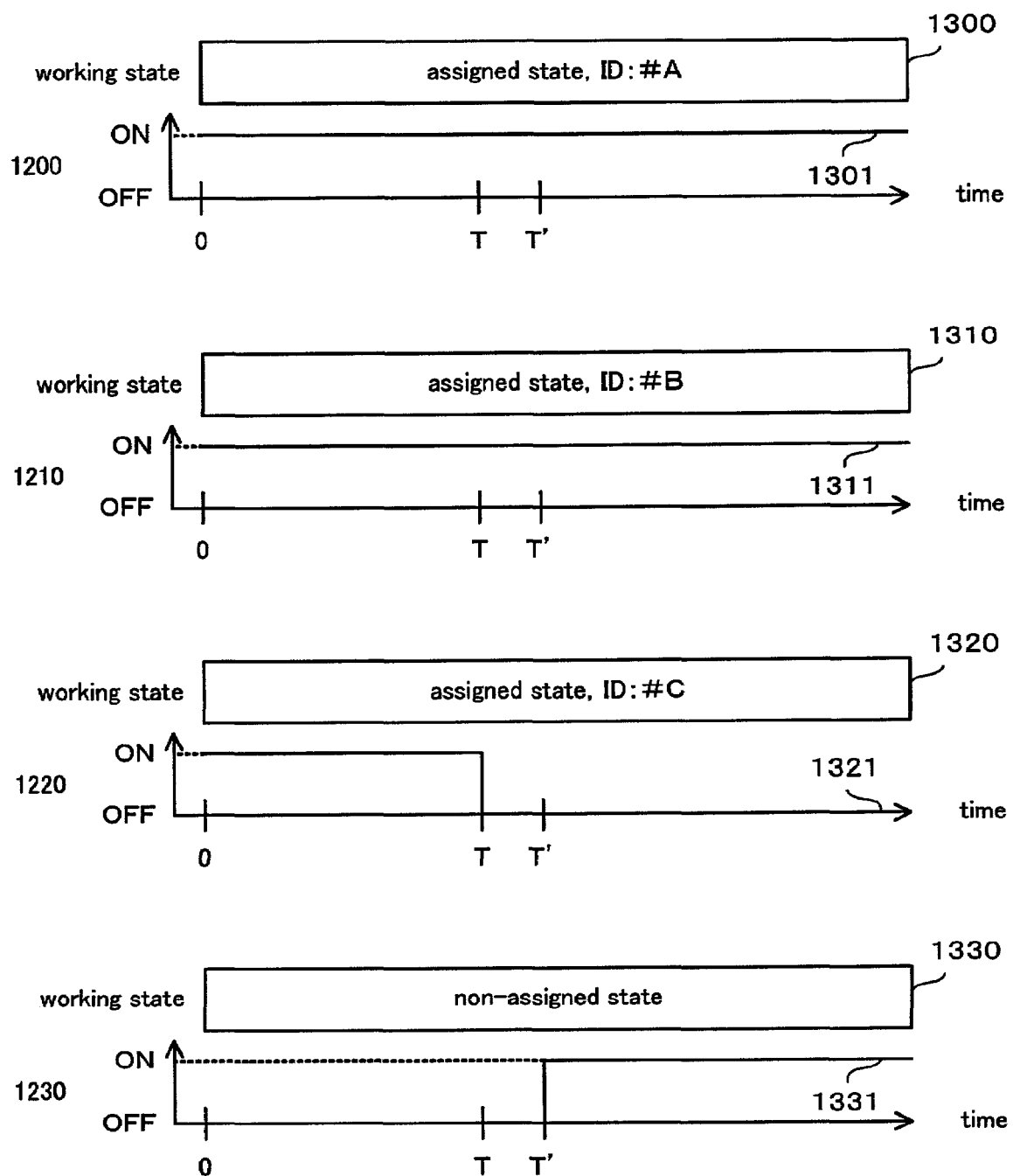
FIG. 13 illustrates identifier assigning states and working states of the respective terminal side devices when the conventional identifier assigning method is used.

FIG. 1 shows a first embodiment of an ATM-PON system for realizing an identifier assigning system according to the present invention. In FIG. 1, constructive components having similar functions to those of the conventional system shown in FIG. 12 are depicted by same reference numerals, respectively. In the ATM-PON system according to this embodiment shown in FIG. 1, the identifier assigning portion 1241 of the network side device 1240 shown in FIG. 12 is deleted and a dynamic identifier assigning portion 141 is newly provided. Further, in FIG. 1, an identifier control portion 100 is added to each of terminal side devices 1200 to 1230. In the following description, it is assumed that a network side device 1240 assigns an identifier to each of the terminal side devices 1200 to 1230 (each of groups of connections accommodated in the respective terminal side devices), similarly to the conventional system.

It may be possible that the network side device 1240 classifies the connections accommodated in the respective terminal side devices 1200 to 1230 to arbitrary connection groups such as QoS (Quality of Service) class groups or user groups and assigns an identifier to each group. Further, it is assumed that a control channel for transmitting a control data from the respective terminal side devices 1200 to 1230 to the network side device 1240 is set for every terminal side device.

The dynamic identifier assigning portion 141 assigns identifiers to the respective terminal side devices 1200 to 1230 and notifies output control portions 1202 of the respective terminal side devices 1200 to 1230 of the information of the identifier assignments through a control signal 1291. A time slot allocating portion 1242 allocates time slots to the respective terminal side devices 1200 to 1230, describes the identifiers assigned to the terminal side devices 1200 to 1230 in the allocated time slots and notifies the output control portions 1202 of the respective terminal side devices 1200 to 1230 of the information through a control signal 1290. The output control portion 1202 transmits a cell to the network side device 1240 in the time slot when the identifier described in the time slot is coincident with the identifier assigned thereto. When the terminal side device 1200 to 1230 becomes in OFF state and requests a release of identifier assigned thereto or when the terminal side device is in the non-assigned state and requests an assignment of identifier, the identifier control portion 100 thereof transmits a control message to the dynamic identifier assigning portion 141 through a control channel. In response to the control message, the dynamic identifier assigning portion 141 can assign an identifier, which is not assigned as yet, to the terminal side device 800 to 830 requesting an identifier.

Figure 2:
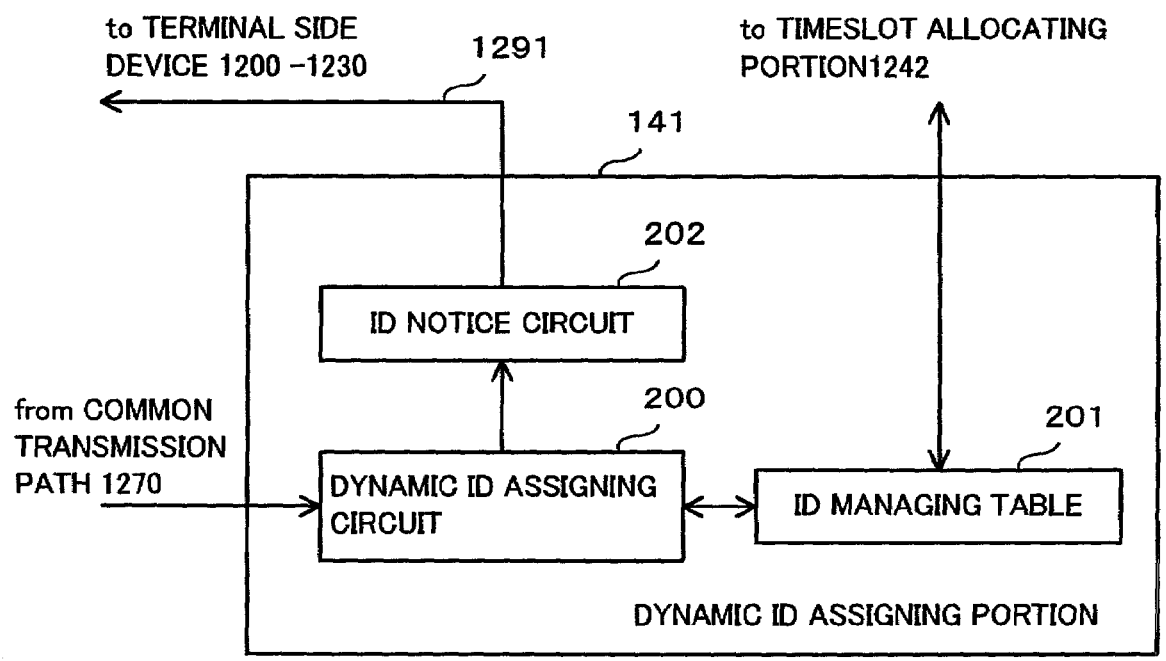
FIG. 2 shows a construction of a dynamic identifier assigning portion, for realizing the identifier assigning method according to the first embodiment of the present invention.

A construction of the dynamic identifier assigning portion 141 for realizing this control will be described with reference to FIG. 2.

The dynamic identifier assigning portion 141 includes a dynamic identifier assigning circuit 200, an identifier managing table 201 and an identifier notice circuit 202. In an initial setting state, the dynamic identifier assigning circuit 200 assigns identifiers to the terminal side devices 1200 to 1230 connected to the network side device 1240, registers the assigned identifiers in the identifier managing table 201 and notifies the identifier notice circuit 202 of the assigned identifiers. Details of the identifier managing table 201 will be described later. Further, in a normal state after the initial setting state, the dynamic identifier assigning circuit 200 receives the control message from the terminal side devices 1200 to 1230 through a shared transmission path 1270. In response to the control message, the dynamic identifier assigning circuit 200 refers to the identifier managing table 201, performs a changing processing for changing an assignment state of identifiers and notifies the identifier notice circuit 202 of the content of the change of identifier assignment. The content of the control message and the changing method of the identifier assignment will be described later. In response to the notice from the dynamic identifier assigning circuit 200, the identifier notice circuit 202 transmits the content of the notice to the terminal side devices 1200 to 1230 through a control signal 1291.

FIG. 3 shows a construction of the identifier managing table 201.

The identifier managing table 201 is constructed with an identifier describing field 300 and an identifier state describing field 301. Identifiers set in the system are described in the identifier describing field 300 and states of the respective identifiers are described in the identifier state describing field 301. The state of identifier includes an assigned state and a non-assigned state. In a case where an identifier is in the assigned state, the terminal side device numbers 1200 to 1230 to which the identifiers are assigned are described in the identifier state describing field 301. In the non-assigned state, identifier such as "Free" indicative of that no identifier is assigned is described in this field.

Figure 4:
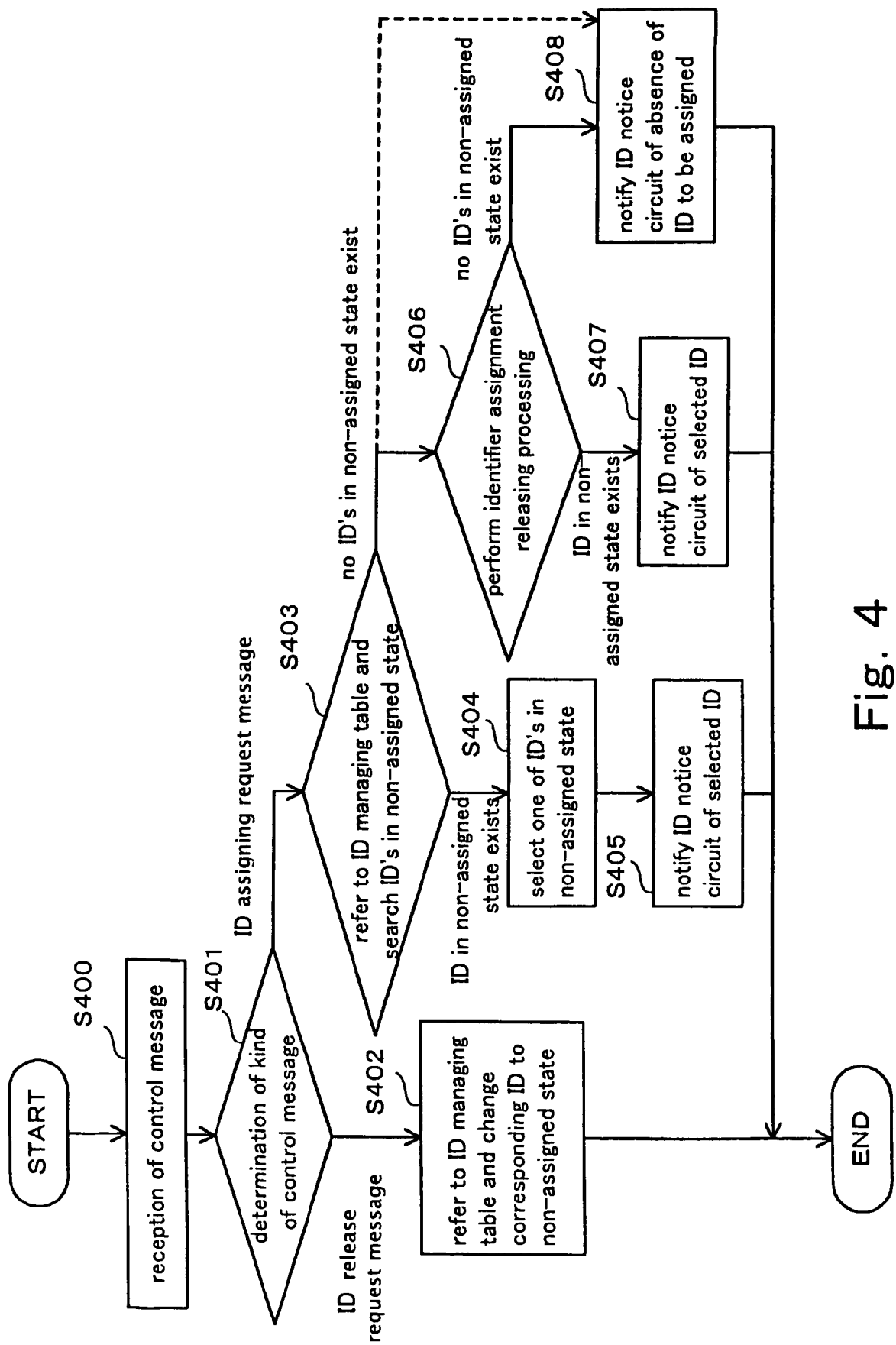
FIG. 4 is a control flowchart of the dynamic identifier assigning portion, for realizing the identifier assigning method according to the first embodiment of the present invention.

Now, an assigning procedure of an identifier performed in the dynamic identifier assigning circuit 200 will be described with reference to FIG. 4, which shows a flowchart of the dynamic identifier assigning procedure. In FIG. 4, the dynamic identifier assigning circuit 200 receives the control message from the identifier control portion 100 of, for example, the terminal side device 1200 (step S400) and determines its content (step S401). The control message from the terminal side device 1200 to the network side device 1240 is the identifier release request message or the identifier assigning request. When the received message is the identifier release request message, the dynamic identifier assigning circuit 200 refers the identifier managing table 201 (step S402) and changes the state of identifier assigned to the terminal side device 1200 to 1230 from which the message is transmitted from the assigned state to the non-assigned state. Describing this in more detail with reference to FIG. 3, the content of the identifier state describing field 301 of the identifier #A in question is changed from the terminal side device (1200 to 1230) to Free. On the other hand, when the control message received in the step S401 is the identifier assigning request message, the dynamic identifier assigning circuit 200 refers the identifier managing table 201 (step S403) and searches the table for identifiers, which are in the non-assigned state, (identifiers described "Free" in the identifier state describing field 301).

When there is one or more identifiers in the non-assigned state as a result of the search, the dynamic identifier assigning circuit 200 selects one of these identifiers (step S404) and changes the state of the selected identifier from the non-assigned state to the assigned state. That is, the content of the corresponding identifier state describing field 301 is changed from Free to the number of the terminal side device from which the identifier assigning request is transmitted. Further, the dynamic identifier assigning circuit 200 notifies the identifier notice circuit 202 of the identifier selected in the step S404 (step S405). On the other hand, if there is no identifier in the non-assigned state as the result of search, the dynamic identifier assigning circuit 200 performs the identifier assignment release processing (step S406). In this assignment release processing, the dynamic identifier assigning circuit 200 selects one of the terminal side devices 1200 to 1230 according to determination made by comparison of communication time or non-communication time with preset threshold value (selection of a terminal side device whose time exceeds the threshold value), determination according to a preset priority, random selection or selection by using a combination of these methods and changes the state of the identifier assigned to the selected terminal side device from the assigned state to the non-assigned state. Thereafter, the dynamic identifier assigning circuit 200 notifies the identifier notice circuit 202 of the selected identifier (step S407). On the other hand, when there is no terminal side device satisfying the condition in the step S406, the identifier assigning circuit 200 notifies the identifier notice circuit 202 of the absence of identifier (step S408). Incidentally, when there is no identifier in the non-assigned state in the step S403, there may be a case where the operation is shifted to the step S408 as shown by a dotted line and determines as no identifier in the non-assigned state without performing the assignment release processing and the absence of identifier is notified to the identifier notice circuit.

Now, an operation of the identifier notice circuit 202 will be described. In response to an identifier information from the dynamic time slot allocation circuit 200 in the initial setting state, the identifier notice circuit 202 notifies the terminal side device of the identifier assigned thereto through an identifier assignment confirmation message. Incidentally, the identifier notice circuit 202 also notifies the terminal side device of the identifier assigned thereto through an identifier assignment confirmation message when, in the normal state, similarly, when it receives an assigned identifier information from the dynamic time slot allocation circuit 200 in the steps S405 and S407 shown in FIG. 4. Further, in the step S408 in FIG. 4, the identifier notice circuit 202 notifies the terminal side device from which the identifier assigning request is transmitted of an assignment refusal of identifier by an identifier assignment refusing message. When the identifier assignment is released in the steps S402 and S406, the identifier notice circuit 202 notifies the terminal side device to which the released identifier was assigned of the identifier release confirmation message.

As described, according to this embodiment, the dynamic identifier assigning circuit 200 dynamically changes the assignment of identifier by making an identifier assigned to a terminal side device in the OFF state to which a time slot is allocated in the non-assigned state and assigning the identifier to a terminal side device in the ON state to which no identifier is assigned. Thus, the assigning objects larger in number than total number of identifiers can transmit data cells to the network side device. Further, when the number of identifier assigning objects accommodated in each of the terminal side devices is not uniform, it is possible to appropriately control them correspondingly to the number of the object by dynamically changing the assignment of the identifiers.

Now, a second embodiment of the present invention will be described with reference to an example in which the identifier control portion 100 shown in FIG. 1 transmits only the identifier assigning request message to the dynamic identifier assigning portion 141 as the control message. Constructions of the ATM-PON system, the dynamic identifier assigning portion 141 and the identifier managing table 201 are the same as those of the first embodiment shown in FIGS. 1, 2 and 3 and a flowchart of the assigning procedures of the dynamic identifier assigning circuit 200 is the same as that shown in FIG. 5. The dynamic identifier assigning circuit 200 performs an identifier assignment release processing similar to the step S406 of the first embodiment periodically (step S500). When the dynamic identifier assigning circuit 200 receives an identifier assignment request message from one of the terminal side devices 1200 to 1230, it changes the identifier assignment by performing a similar processing to the step S403 and subsequent steps of the first embodiment (step S501).

Figure 5:
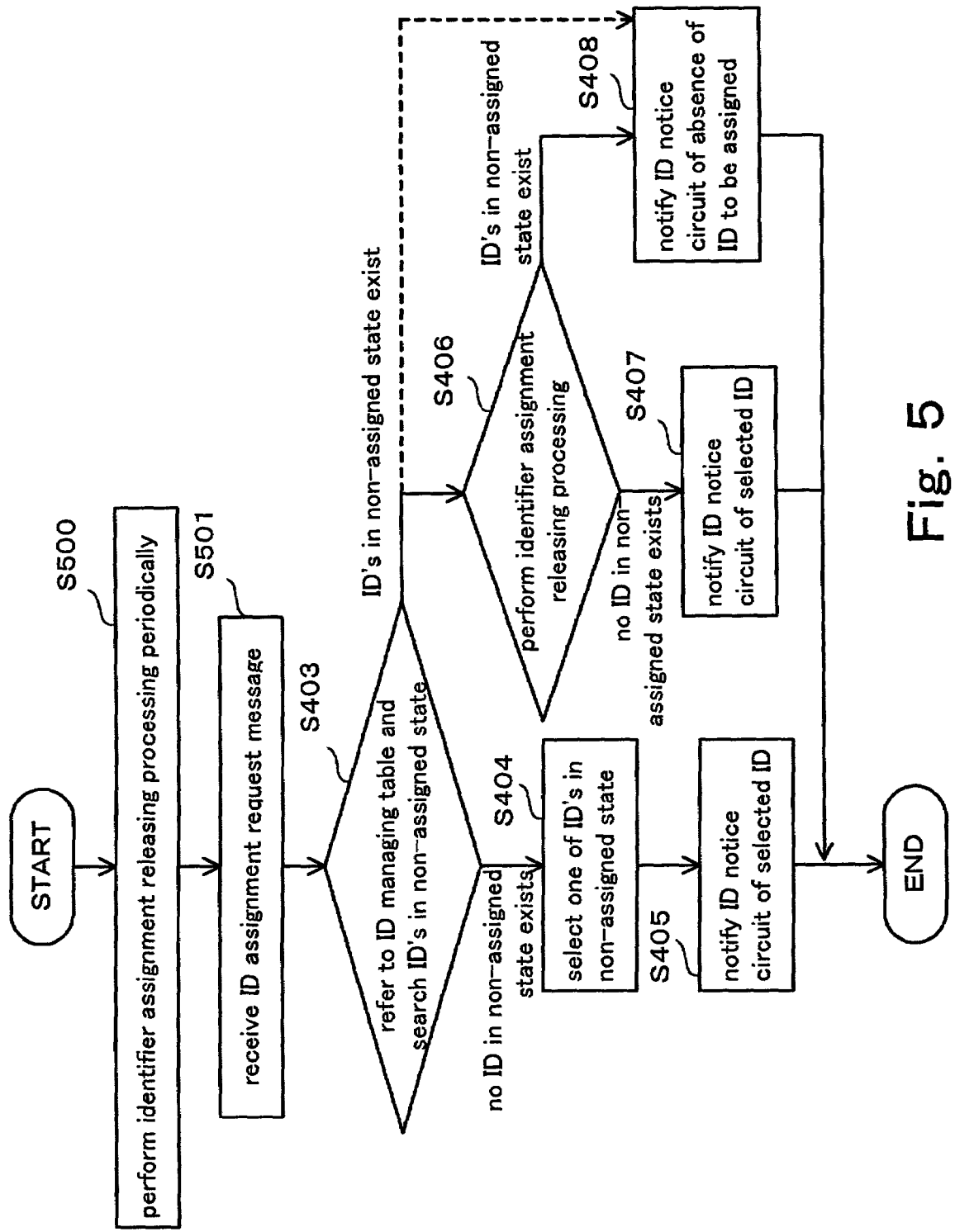
FIG. 5 is another control flowchart of the dynamic identifier assigning portion, for realizing the identifier assigning method according to a second embodiment of the present invention.
Figure 6:
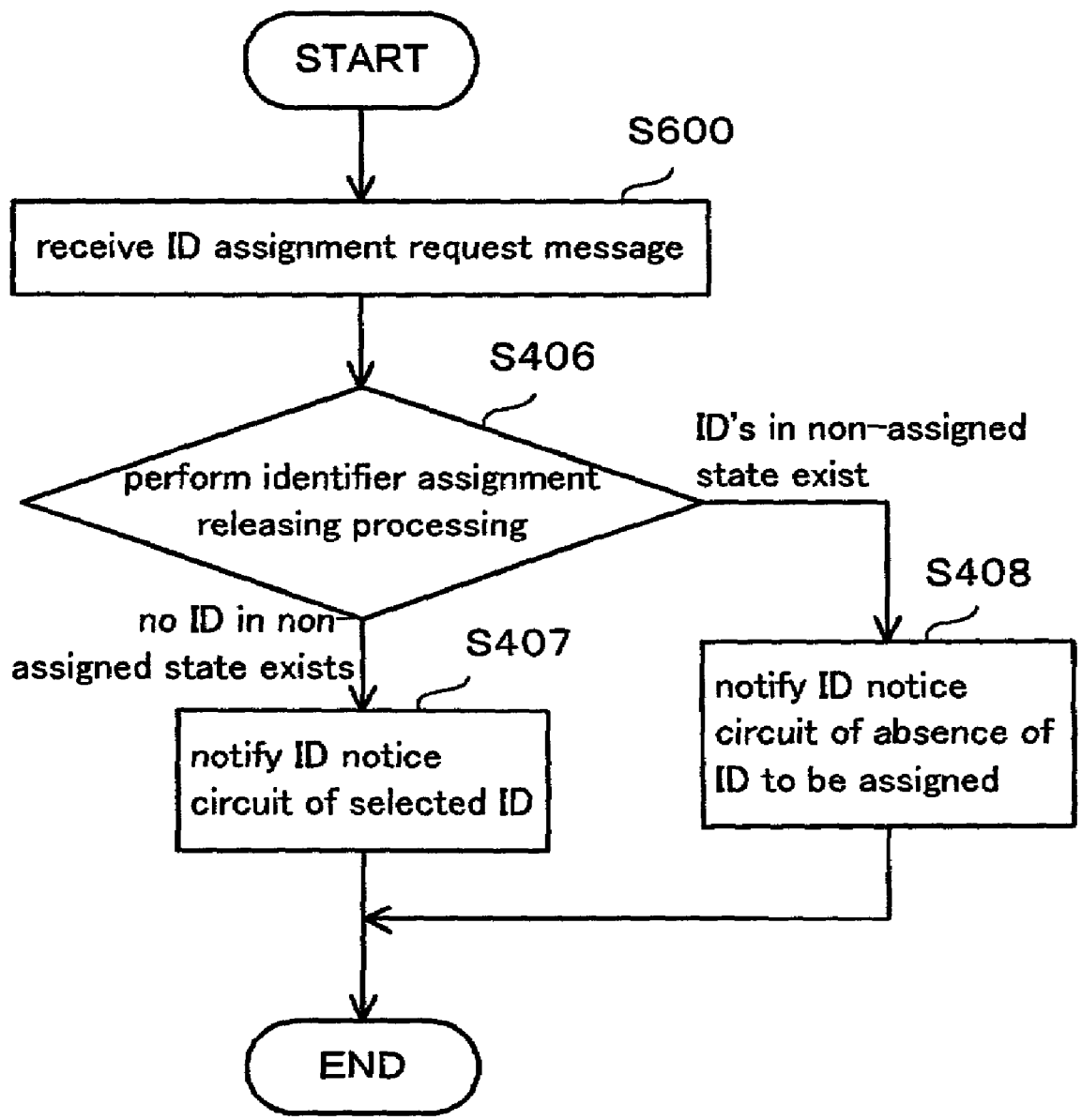
FIG. 6 is another control flowchart of the dynamic identifier assigning portion, for realizing the identifier assigning method according to a modification of the second embodiment of the present invention.

In another example, a flowchart of the assigning procedures of the dynamic identifier assigning circuit 200 is the same as that shown in FIG. 6. In the example shown in FIG. 6, the dynamic identifier assigning circuit 200 does not perform the identifier assignment release processing performed periodically in the step S500 shown in FIG. 5. When the dynamic identifier assigning circuit 200 receives an identifier assignment request message from one of the terminal side devices 1200 to 1230, it performs an identifier assignment release processing similar to the step S406 of the first embodiment 3 and subsequent steps of the first embodiment (step S600). The processing in steps S407 and S408 performed after the assignment release processing are similar to those in FIGS. 4 and 5.

In the first embodiment, the identifier assignment release processing is performed according to the request from the terminal side devices 1200 to 1230. In the second embodiment shown in FIGS. 5 and 6, the identifier assignment release processing is executed according to the judgement made by the network side device 1240. Therefore, there is no need of the identifier assignment release message from the terminal side device in the second embodiment. In this embodiment, it is possible to transmit data cells from the objects larger in number than the identifiers to the network side device and to appropriately assign identifiers to the objects even when the number of the objects accommodated in each of the terminal side devices is not constant, similarly to the first embodiment.

Figure 7:
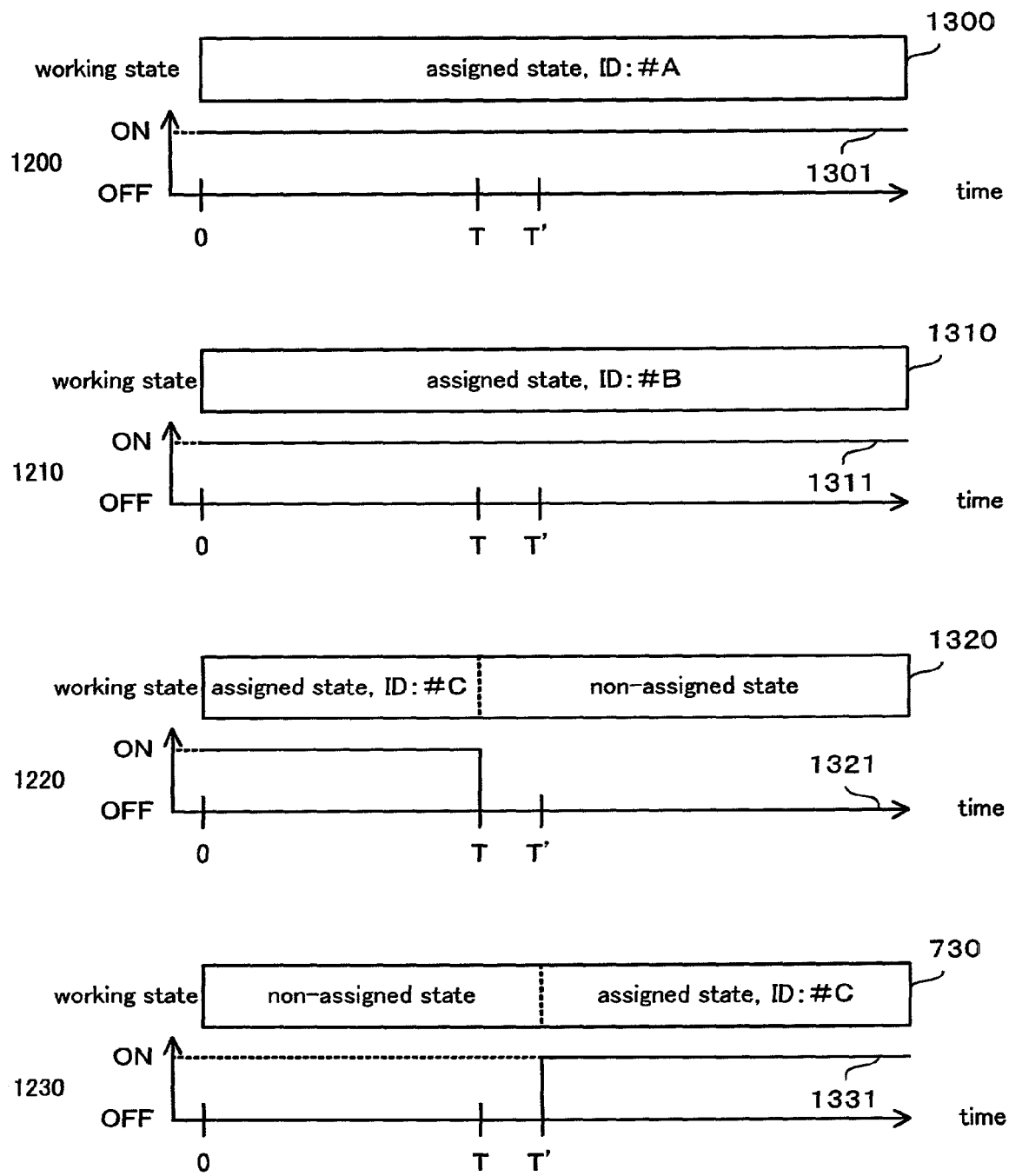
FIG. 7 illustrates identifier assigning states and working states of the respective terminal side devices in a case where an identifier assigning method according to a third embodiment of the present invention.

Now, an identifier assignment to the terminal side devices 1200 to 1230 and 1232 according to a third embodiment will be described. FIG. 7 shows identifier assigning states 1300, 1310, 1320 and 730 to the respective terminal side devices 1200, 1210, 1220 and 1230 and working state 1301, 1311, 1321 and 1331 thereof in time series similarly to FIG. 7. In the system, three kinds of identifier, that is, #A, #B and #C, are set. In the initial setting, the identifiers #A, #B and #C are assigned to the terminal side devices 1200, 1210 and 1220, respectively, and there is no identifier assigned to the terminal side device 1230.

Figure 8:
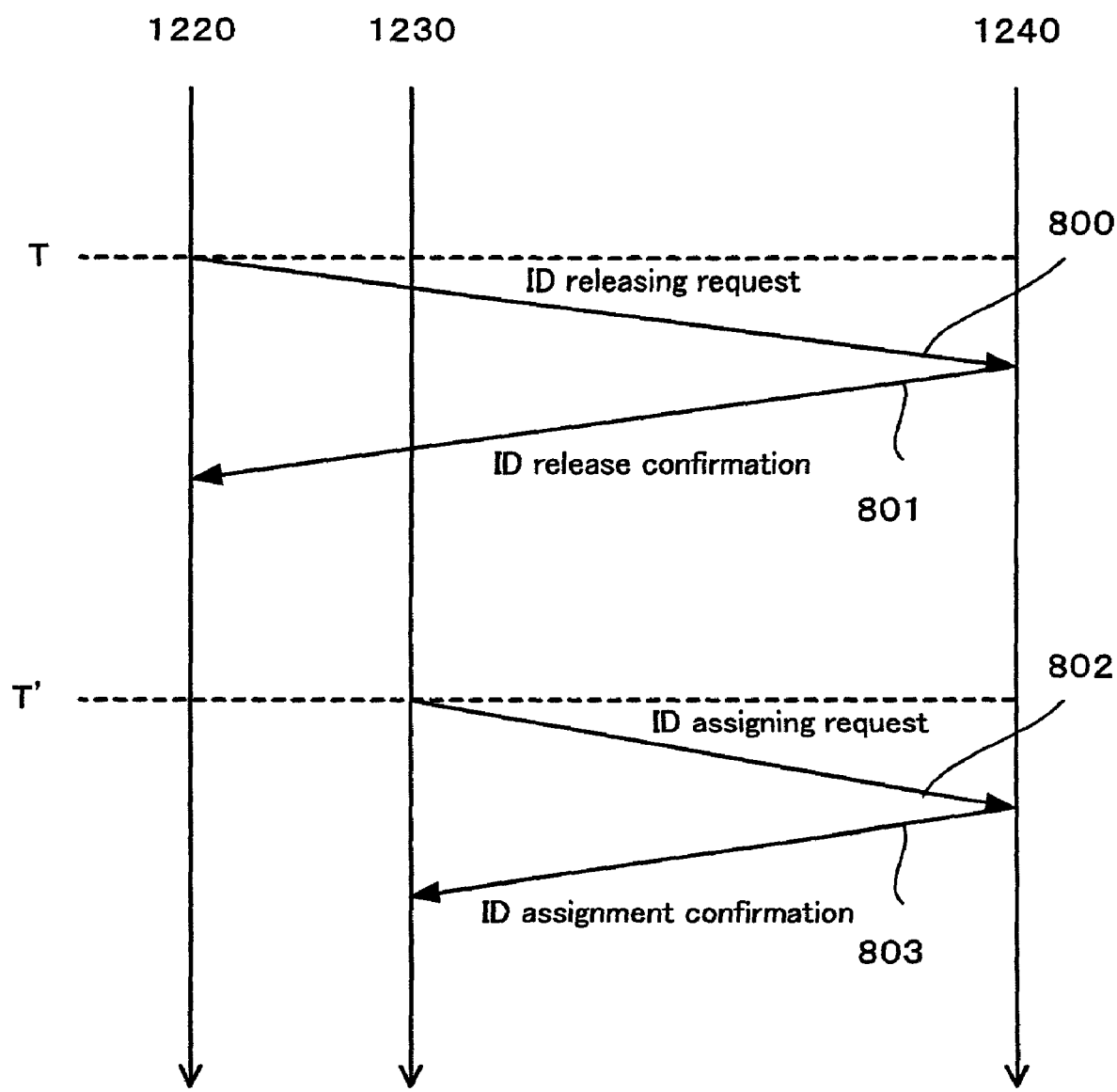
FIG. 8 is a message flowchart between the network side device and the terminal side devices, for realizing the identifier assigning method according to the third embodiment of the present invention.

In FIG. 7, the working state 1321 of the terminal side device 1220 is changed from the ON state to the OFF state at a time instance T and the working state 1331 of the terminal side device 1230 is changed from the OFF state to the ON state at a time instance T' thereafter. The control of the present invention in this case will be described with reference to FIGS. 8 and 9. FIG. 8 shows a message flow between the network side device 1240 and the terminal side devices 1220 and 1230 and FIG. 9 is a content of the identifier managing table 201.

When the working state 1321 of the terminal side device 1220 is changed from the ON state to the OFF state at the time instance T, the terminal side device 1220 transmits an identifier release request message 800 to the network side device 1240. In response to the identifier release request message 800, the network side device 1240 refers the identifier managing table 201 shown in FIG. 9(1) and changes the state of the identifier #C assigned to the terminal side device 1220 to the non-assigned state. In detail, the content of the corresponding identifier state describing field 301-3-(1) is changed from terminal side device 1220 to Free. With this change, the content of the identifier managing table 201 is changed to that shown in FIG. 9(2). After the network side device 1240 changes the content of the identifier managing table 201, the network side device 1240 transmits an identifier release confirmation message 801 to the terminal side device 1220. Thereafter, when the working state 1331 of the terminal side device 1230 is changed from the OFF state to the ON state at the time instance T', the terminal side device 1230 transmits an identifier assigning request message 802 to the network side device 1240. In response to the identifier assigning request message 802, the network side device 1240 refers the identifier managing table 201 shown in FIG. 9(2) and searches the state, which is the non-assigned state, that is, the identifiers, which are described in the identifier state describing field 301 as Free. As a result of this search, it may be found that there is the description Free in the identifier state describing field 301-3-(2) of the identifier #C and the identifier #C is in the non-assigned state. In such case, in order to assign the identifier #C to the terminal side device 1230, the content of the assignment state describing field 301-3-(2) is changed from Free to terminal side device 1230. With this change, the content of the identifier managing table 201 is changed to that shown in FIG. 9(3). The network side device 1240, which assigned the identifier #C to the terminal side device 1230, notifies the terminal side device 1230 of the identifier assigned (identifier #C) through the identifier assigning confirmation message 803. Upon this control, the state 1320 of the terminal side device 1220 becomes the non-assigned state after the time instance T as shown in FIG. 7. The state 730 of the terminal side device 1230 becomes the assigned state after the time instance T' and the identifier #C, which was assigned to the terminal side device 1220 before the time instance T, is assigned to the terminal side device 1230.

By assigning the identifier assigned to the terminal side device, which becomes the OFF state, to the terminal side device, which is non-assigned state and becomes the ON state, in this manner, the terminal side devices to which no identifier is assigned in the initial setting time can transmit data cells to the network side device and a larger number of terminal side devices than the total number of identifiers can transmit data cells to the network side device. Further, by dynamically changing the assignment of identifier, it is possible to appropriately assign identifiers to objects accommodated in the respective terminal side devices even when the number of the objects in the respective terminal side devices is uneven.

Figure 10:
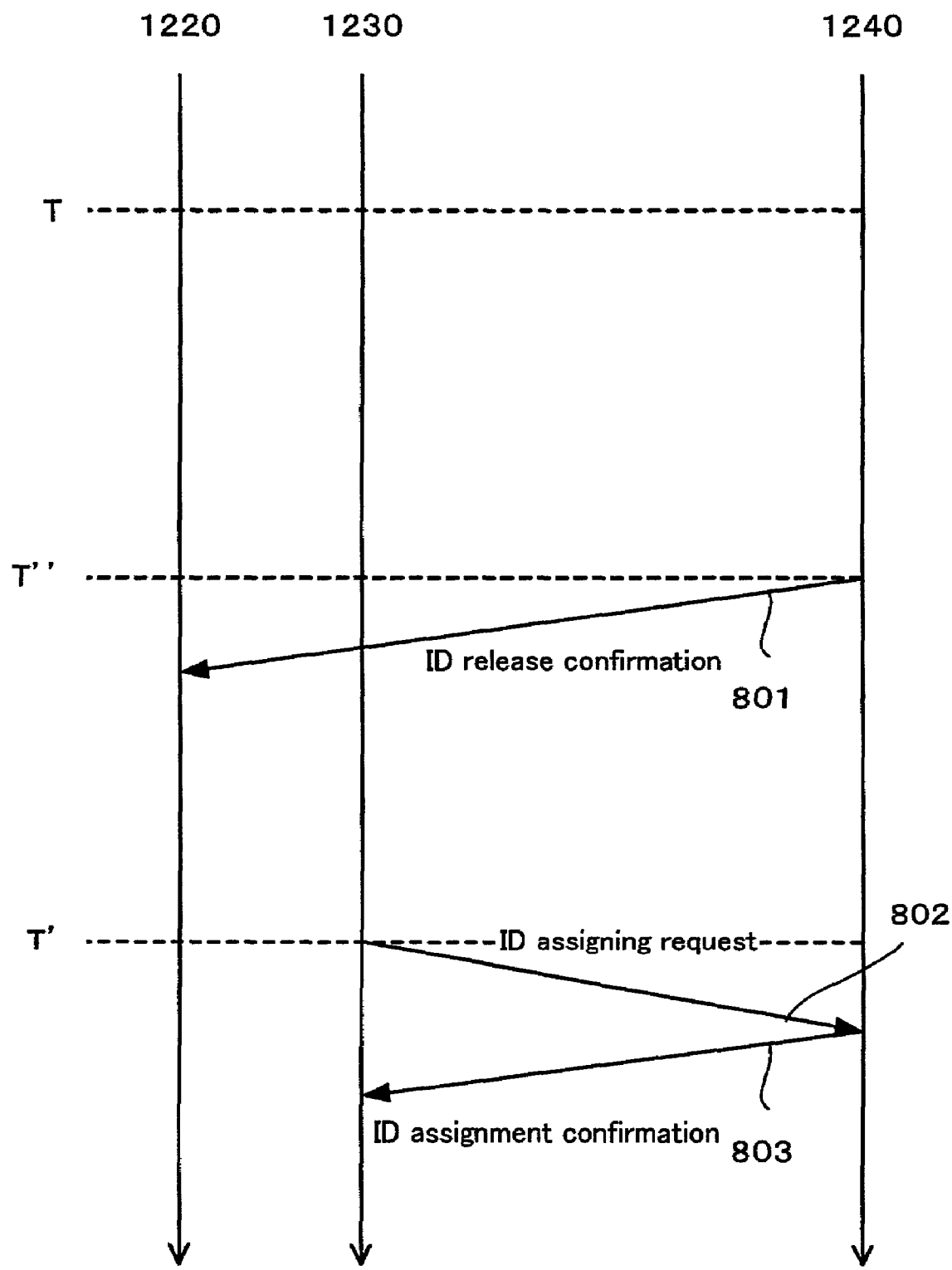
FIG. 10 is a message flowchart between the network side device and the terminal side devices, for realizing the identifier assigning method according to a fourth embodiment of the present invention.

As a fourth embodiment of the present invention, an example of the identifier assignment in which the dynamic time slot allocation circuit 200 of the network side device 1240 assigns identifiers to the terminal side devices 1200 to 1230 according to the identifier assigning procedures shown in FIG. 5 will be described. Conditions used in this embodiment are similar to those in the third embodiment and FIG. 10 shows the message flow between the terminal side devices 1220 and 1230 and the network side device 1240 described with reference to FIG. 8.

The dynamic time slot allocation circuit 200 of the network side device 1240 performs the identifier release processing periodically and it is assumed that the processing is performed at a time instance T" in FIG. 7. In this identifier release processing, the dynamic time slot allocation circuit 200 searches terminal side devices 1200 to 1230 whose non-communication times, for example, exceed the preset threshold values. Assuming, in this time, that the non-communication time of the terminal side device 1220 exceeds its threshold value, the working state 1321 of the terminal side device 1220 is determined as in the OFF state and the identifier #C assigned thereto is released. That is, the state of the identifier #C assigned to the terminal side device 1220 is changed to the non-assigned state. Therefore, its content is changed from that shown in FIG. 9(1) to that shown in FIG. 9(2). After the content of the identifier managing table 201 is changed, the network side device 1240 transmits the identifier release confirmation message 801 to the terminal side device 1220. Thereafter, when the working state 1331 of the terminal side device 1230 is changed from the OFF state to the On state at the time instance T', the terminal side device 1230 transmits the identifier assigning request message 802 to the network side device 1240. In response to the identifier assigning request message 802, the network side device 1240 performs a processing similar to that in the third embodiment and notifies the terminal side device 1230 of the identifier #C assigned thereto through the identifier assignment confirmation message 803.

Figure 11:
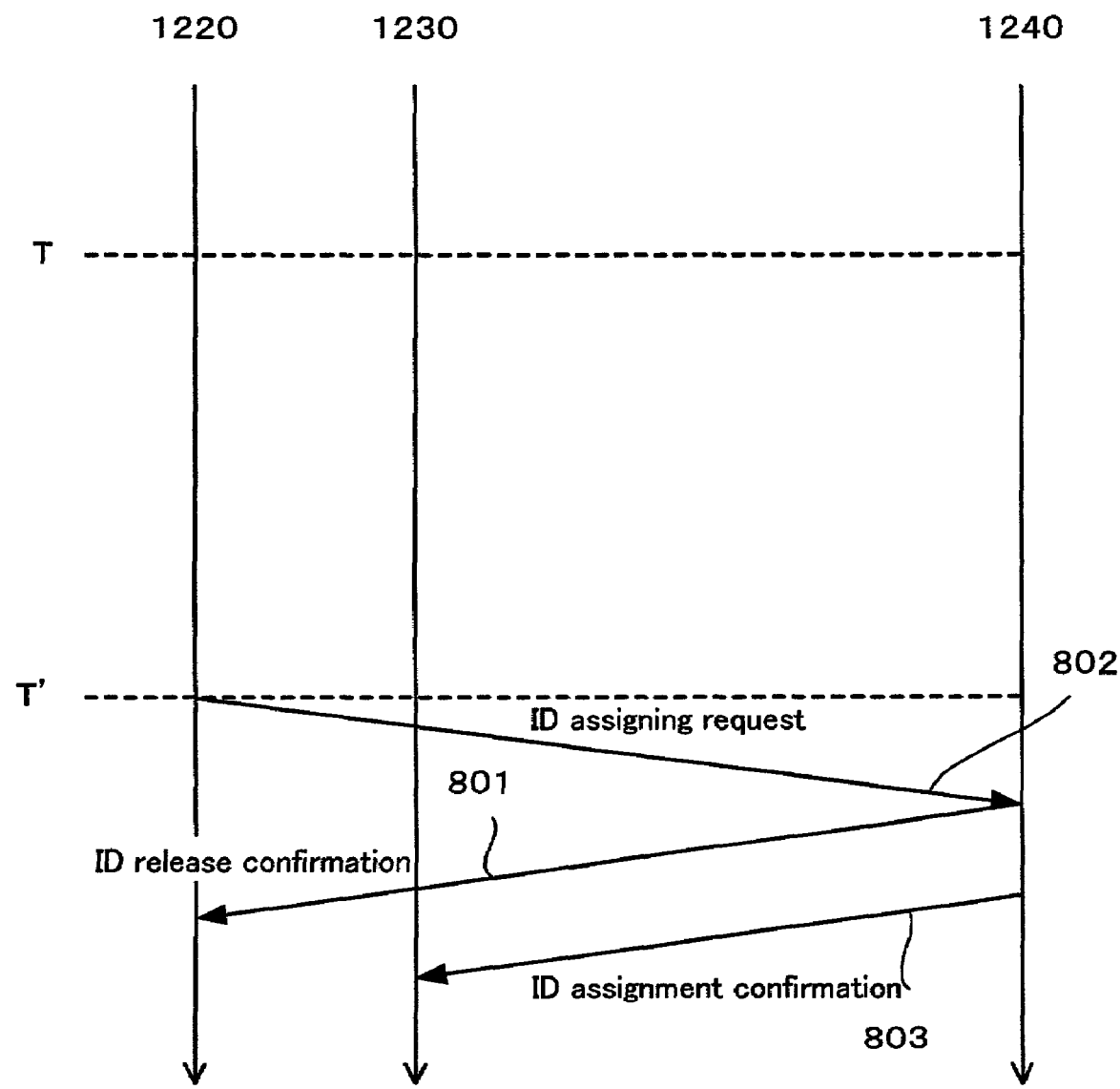
FIG. 11 shows an example of numerical values in the identifier managing table for realizing an identifier assigning method according to a modification of the fourth embodiment of the present invention.

As another example, there may be a case where the dynamic identifier assigning circuit 200 of the network side device 1240 uses the identifier assigning method described with reference to FIG. 6. An identifier assignment in such case will be described. Conditions are similar to those described in either of the above two examples and FIG. 11 shows message flows between the terminal side devices 1220 and 1230 and the network side device 1240 described with reference to FIGS. 8 and 10.

When the working state 1331 of the terminal side device 1230 is changed from the OFF state to the ON state at the time instance T', the terminal side device 1230 transmits the identifier assigning request message 802 to the network side device 1240. In response to the identifier assigning request message 802, the network side device 1240 performs an identifier release processing similar to that in the example shown in FIG. 10 and sends the identifier release confirmation message 801 to the terminal side device 1220 to which the identifier #C is assigned thereto. As a result thereof, the content of the identifier managing table 201 is changed from that shown in FIG. 7(1) to that shown in FIG. 7(2). And, when the identifier #C, which is in non-assigned state, is assigned to the terminal side device 1230 from which the identifier assignment request message 802 is transmitted, the identifier managing table 201 is changed to that shown in FIG. 7(3). The network side device 1240, which assigns the identifier #C to the terminal side device 1230, notifies the terminal side device 1230 of the identifier #C through the identifier assigning message 803.

In the described two examples of this embodiment, it is also possible to transmit data cells from the objects larger in number than the identifiers to the network side device and to appropriately assign identifiers to the objects even when the number of the objects accommodated in each of the terminal side devices is not constant. Further, by performing the QoS control and/or equity control of every group by the network side device, the construction of the terminal side device becomes simplified.

As described hereinbefore, according to the identifier assigning method of the present invention, there are merits that it is possible to transmit data cells from the objects larger in number than the identifiers to the network side device and to appropriately assign identifiers to the objects even when the number of the objects accommodated in each of the terminal side devices is not constant.

That is, in the identifier assigning method of the present invention, the identifier assignment is dynamically controlled by making the state of the identifier assigned to an object in the non-assigned state when the object in the identifier assigned state becomes in the OFF state and assigning the identifier to an object in the non-assigned state when the object becomes in the ON state. By such control, it is possible to transmit data cells from the objects larger in number than the identifiers to the network side device.

Even when the number of the objects accommodated in each of the terminal side devices is not constant, it is possible to appropriately assign identifiers correspondingly to the number of the objects. Therefore, the system utilizing the identifier assigning method according to the present invention is advantageous compared with the conventional identifier assigning system in which identifiers are fixedly assigned to respective terminal side devices in that the accommodation efficiency of the system is improved.

What is claimed is:

1. A packet communication system in which a plurality of terminal side devices are connected to a network side device through a shared transmission medium, said network side device allocates time slots to identifier assigning objects accommodated in each of said respective terminal side devices and the respective identifier assigning objects transfer packets through a physical medium by using the time slots allocated thereto, wherein said network side device comprising:

identifier assigning means for assigning identifiers for identifying time slots allocated to said respective identifier assigning objects accommodated in each of said terminal side devices and notifying said respective identifier assigning objects of the assigned identifier; and time slot allocating means for allocating time slots to said respective identifier assigning objects accommodated in each of said terminal side devices, describing the identifiers assigned to said identifier assigning objects in the time slots and notifying said objects of the identifiers, each of said terminal side devices comprising:

buffer means for storing packets inputted from a plurality of terminals connected to said terminal side device in every identifier assigning object;

output control means for holding identifiers assigned to said respective identifier assigning objects accommodated in each of said terminal side devices according to a notice content notified by said identifier assigning means of said network side device and, when the identifiers described in the time slots notified by said time slot allocating means are coincident with the identifiers assigned to said identifier assigning objects accommodated in each of said terminal side devices, outputting packets from said buffer means corresponding to said identifier assigning objects; and identifier control means for transmitting an identifier assigning request for requesting an assignment of identifier to identifier assigning objects to which identifiers are not assigned to said network side device, said identifier assigning means comprising:

dynamic assigning means for changing a state of an identifier from an assigned state to a non-assigned state by performing an identifier releasing processing for the identifier on demand, selecting any one of the identifiers and assigning the selected identifier to said identifier assigning object from which the identifier assignment request is transmitted, when an identifier assigning request is received from said identifier control means and there is one or more identifiers in the non-assigned state, wherein said dynamic assigning means selects an object whose identifier is to be released, according to a preset priority order for releasing said respective identifier assigning objects accommodated in each of said terminal side devices; and notice means for notifying the object from which the identifier assignment request is transmitted when the identifier releasing processing is performed, a new identifier is assigned and no identifier in the non-assigned state exists for the identifier assigning request.

2. A packet communication system as claimed in claim 1, wherein said dynamic assigning means performs an identifier release processing when said dynamic assigning means receives the identifier release request from said identifier control means and there is no identifier in the non-assigned state although said dynamic assigning means receives the identifier assigning request from said identifier control means.

3. A packet communication system as claimed in claim 1, wherein said dynamic assigning means performs the identifier releasing processing periodically and when there is no identifier in the non-assigned state although said dynamic assigning means receives the identifier assigning request from said identifier control means.

4. A packet communication system as claimed in claim 1, wherein said dynamic assigning means performs the identifier release processing when the identifier assigning request from the identifier control means is received.

5. A packet communication system as claimed in claim 1, wherein said dynamic assigning means selects an object having an identifier assigned for a time exceeding a preset threshold time as an object whose identifier is to be released.

6. A packet communication system as claimed in claim 1, wherein said dynamic assigning means selects an object whose non-communication time exceed a preset threshold time as an object whose identifier is to be released.

7. A packet communication system as claimed in claim 1, wherein one or a plurality of connections are made a group and an identifier and a time slot are allocated to every group.

8. A packet communication system as claimed in claim 7, wherein said connections accommodated in one terminal side device is made a group.

9. A packet communication system as claimed in claim 7, wherein said connections accommodated in one terminal side device are classified in every service class and said connections in each service class is made a group.

10. A packet communication system as claimed in claim 7, wherein said connections accommodated in one terminal side device for every user is made a group.

11. A packet communication system as claimed in claim 1, wherein the packet transferred is a cell used in asynchronous transfer mode.

12. A packet communication system in which a plurality of terminal side devices are connected to a network side device through a shared transmission medium, said network side device allocates time slots to identifier assigning objects accommodated in each of said respective terminal side devices and the respective identifier assigning objects transfer packets through a physical medium by using the time slots allocated thereto, wherein said network side device comprising:
identifier assigning means for assigning identifiers for identifying time slots allocated to said respective identifier assigning objects accommodated in each of said terminal side devices and notifying said respective identifier assigning objects of the assigned identifier; and
time slot allocating means for allocating time slots to said respective identifier assigning objects accommodated in each of said terminal side devices, describing the identifiers assigned to said identifier assigning objects in the time slots and notifying said objects of the identifiers,
each of said terminal side devices comprising:
buffer means for storing packets inputted from a plurality of terminals connected to said terminal side device in every identifier assigning object;
output control means for holding identifiers assigned to said respective identifier assigning objects accommodated in each of said terminal side devices according to a notice content notified by said identifier assigning means of said network side device and, when the identifiers described in the time slots notified by said time slot allocating means are coincident with the identifiers assigned to said identifier assigning objects accommodated in each of said terminal side devices, outputting packets from said buffer means corresponding to said identifier assigning objects; and
identifier control means for transmitting an identifier assigning request for requesting an assignment of identifier to identifier assigning objects to which identifiers are not assigned to said network side device,
said identifier assigning means comprising:
dynamic assigning means for changing a state of an identifier from an assigned state to a non-assigned state by performing an identifier releasing processing for the identifier on demand, selecting any one of the identifiers and assigning the selected identifier to said identifier assigning object from which the identifier assignment request is transmitted, when an identifier assigning request is received from said identifier control means and there is one or more identifiers in the non-assigned state; and
notice means for notifying the object from which the identifier assignment request is transmitted when the identifier releasing processing is performed, a new identifier is assigned and no identifier in the non-assigned state exists for the identifier assigning request,
wherein said dynamic assigning means randomly selects an object whose identifier is to be released.

13. A network side device of a packet communication system in which said network side device is connected to a plurality of terminal side devices by using a shared communication medium, comprising:
identifier assigning means for assigning identifiers for identifying time slots allocated to respective identifier assigning objects accommodated in a terminal side device and notifying said respective identifier assigning objects of the assigned identifiers; and
time slot allocating means for allocating time slots to said respective identifier assigning objects accommodated in said terminal side device, describing the identifiers assigned to said respective identifier assigning objects in the time slots and notifying said objects of the identifiers,
said identifier assigning means comprising:
dynamic assigning means for changing a state of an identifier in an assigned state to a non-assigned state by performing an identifier releasing processing on demand for the identifier, selecting one of the identifiers and assigning the selected identifier to one of said respective identifier assigning objects from which an identifier assignment request is transmitted when an identifier assigning request is received from an identifier control means and there is one or more identifiers in the non-assigned state;
wherein said dynamic assigning means selects an object whose identifier is to be released, according to a preset priority order for releasing said respective identifier assigning objects accommodated in said terminal side device; and
notice means for notifying said object of the identifier releasing processing when the identifier releasing processing is performed, when a new identifier is assigned and when there is no identifier in the non-assigned state for the identifier assigning request.

14. A terminal side device connected to a network side device through a shared transmission medium used commonly by other terminal side devices and transferring packets from objects accommodated therein by using time slots allocated to said objects by said network side device, comprising:
buffer means for storing packets inputted from a plurality of terminals connected to said terminal side device in each respective identifier assigning object;
output control means for holding identifiers notified by said network side device and assigned to said each respective identifier assigning object accommodated in said terminal side device and outputting packets from the buffer means for said each respective identifier assigning object when the identifiers described in the time slots notified by the time slot allocating means are coincident with the identifiers assigned to said each respective identifier assigning object accommodated in the terminal side device; and identifier control means for transmitting an identifier assigning request for said each respective identifier assigning object to which an identifier is not assigned to said network side device, wherein said identifier control means includes dynamic assigning means for selecting an object whose identifier is to be released, according to a preset priority order for releasing said each respective identifier assigning object accommodated in said terminal side device.

15. A terminal side device as claimed in claim 14, wherein said identifier control means includes means for transmitting an identifier release request for an object having an identifier assigned thereto to said network side device.

16. An identifier assigning method for use in a communication system in which a plurality of terminal side devices and a network side device are connected to each other through a shared transmission medium, for assigning identifiers for identifying time slots allocated to objects accommodated in said terminal side devices, wherein each of said terminal side devices transmits an identifier assigning request requesting an identifier assignment to an object having no identifier assigned thereto to said network side device; and said network side device confirms states of all identifiers in response to the identifier assigning request, selects one of identifiers in a non-assigned state when one or more identifiers in die non-assigned state exist, sets the selected identifier as an identifier to be assigned to said object and notifies said object of the selected identifier, performs an assignment release processing for an identifier in an assigned state when there is no identifier in the non-assigned state, selects one of identifiers when there are identifiers in the non-assigned state as a result of the assignment release processing, sets the selected identifier as an identifier to be assigned to said object, wherein said network side device selects said object whose identifier is to be released, according to a preset priority order for releasing said each respective identifier assigning object accommodated in said terminal side device, and notifies said object of the identifier to be assigned thereto notifies said object of an absence of identifier to be assigned thereto when there is no identifier in the non-assigned state as a result of the identifier assignment release processing.

17. An identifier assigning method as claimed in claim 16, wherein said terminal side device transmits the identifier assigning request for an object in the non-assigned state to the network side device and said network side device changes the state of said object from the non-assigned state to the assigned state in response to the identifier assigning request and notifies said object of the change of the state of said object.

18. An identifier assigning method as claimed in claim 16, wherein said network side device performs the identifier assignment release processing for identifiers in the assigned state periodically.

19. An identifier assigning method for use in a communication system in which a plurality of terminal side devices and a network side device are connected to each other through a shared transmission medium, for assigning identifiers for identifying time slots allocated to objects accommodated in said terminal side devices, wherein one of said terminal side devices transmits an identifier assigning request for an object included in said one terminal side device and having no identifier assigned thereto to said network side device;

said network side device performs an identifier assignment release processing for already assigned identifiers in response to the identifier assigning request from said one terminal side device and, when there are identifiers in a non-assigned state as a result of the assignment release processing, selects one of the non-assigned identifiers, sets the selected non-assigned identifier as an identifier to be assigned to the object in said terminal side device from which the identifier assigning request is transmitted, wherein said network side device selects said object whose identifier is to be released, according to a preset priority order for releasing said each respective identifier assigning object accommodated in said terminal side device, notifies said object of the identifier and, when there is no identifier in the non-assigned state as the result of the assignment release processing, notifies said object of absence of identifier to be assigned thereto.

* * * * *